Figure 1:
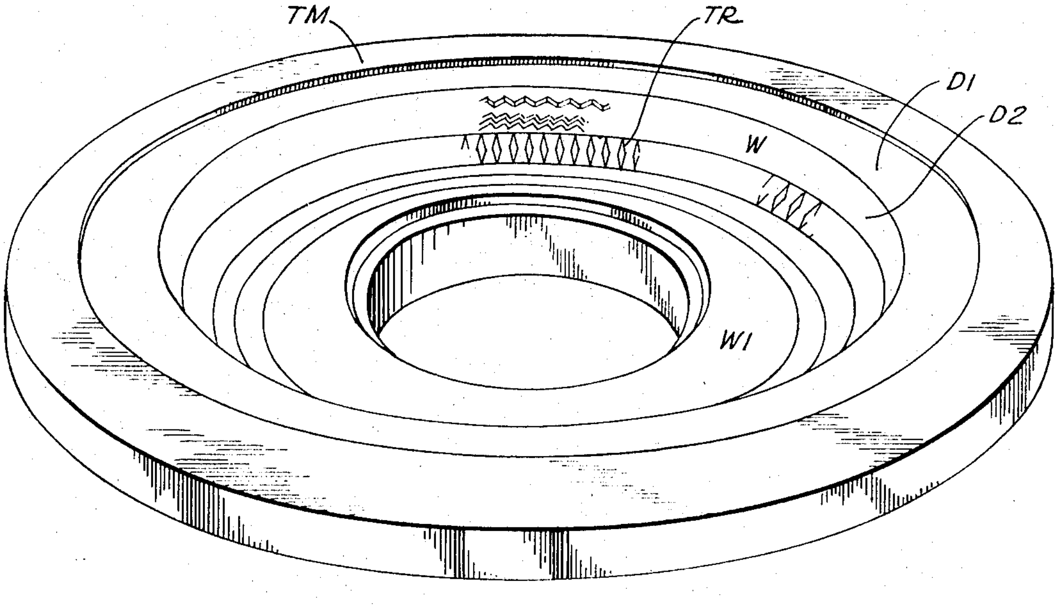

United States Patent [19]

Langenbach

[11] 3,788,761

[45] Jan. 29, 1974

[54] MACHINE TOOL WITH ANGULARLY ADJUSTABLE TOOL HEAD

[75] Inventor: Bob J. Langenbach, Athens, Ohio

[73] Assignee: Abex Corporation, New York, N.Y.

[22] Filed: July 14, 1970

[21] Appl. No.: 62,735

Related U.S. Application Data

[62] Division of Ser. No. 752,200, Aug. 13, 1968, Pat. No. 3,584,524.

[52] U.S. Cl. .......... 408/236, 90/17

[51] Int. Cl. .......... B23b 39/12, B23b 39/14

[58] Field of Search .......... 408/236, 237; 90/17

[56] References Cited

UNITED STATES PATENTS

| | | | |
|---|---|---|---|
| 661,586 | 11/1900 | Prentice | 408/237 |
| 1,420,319 | 6/1922 | Kelley | 408/237 X |
| 3,232,141 | 2/1966 | Swanson et al. | 408/237 X |
| 2,621,686 | 12/1952 | Tompkins | 408/236 X |
| 1,989,007 | 1/1935 | Gorton | 408/236 X |

*Primary Examiner*—Francis S. Husar
*Attorney, Agent, or Firm*—Kinzer and Dorn

[57] ABSTRACT

An automatic drilling machine is afforded in which the drill is automatically retracted when excessive resistance is encountered, and upon retraction may be automatically cleaned, lubricated and cooled. At no time is more than one-half the length of the drill unsupported.

2 Claims, 30 Drawing Figures

MACHINE TOOL WITH ANGULARLY ADJUSTABLE TOOL HEAD

This application is a division of application Ser. No. 752,200 filed Aug. 13, 1968, now U.S. Pat. No. 3,584,524.

This invention relates to a machine tool which presents a drill to a work piece, and in particular to a machine tool for drilling vent holes in tire molds.

Automotive tires, as well as tires for heavy duty earthmoving equipment, are vulcanized in tire molds which present the pattern for the tire tread, the various diameters of the tire and the sipe plates which are responsible for forming thin slits in the tread of the tire for improving performance of the tire. The actual mold construction requires vent holes for venting the mold in the course of vulcanizing the rubber. Superior tire molds are cast or forged from metal, and the present practice is to drill the vent holes by manually operated power drills. The drills, or bits as they are sometimes called, are expensive and a great deal of breakage occurs which not only increases the cost of production, but which also slows the rate of production as an additional cost factor.

The primary object of the present invention is to lower the cost of producing tire molds and to do this by a machine tool which greatly diminishes the likelihood of broken drills, which enables a plurality of tire molds to be drilled simultaneously and fully automatically, and to support the drill by a head index which affords universal movement of the drill motor so that the drill can work at any diameter and any angle, and can be readily switched from a position where it works on one wall of the mold to a position where it will work on an opposed wall of the mold.

Further objects of the present invention are to construct a machine tool of the automatic drill type which can also be used for performing operations similar to the foregoing on work pieces other than tire molds, to automatically lubricate and clean the tip of the drill, to retract the drill in the event the work piece presents an unacceptable high resistance likely to break the drill, and to efficiently move the drill in opposed reciprocal directions incidental to performing work. Yet further objects of the present invention are to incorporate in the machine tool sensing means and memory means which will detect critical conditions and circumstances for controlling the machine, to lend constant support to the intermediate length of the drill while it is working, and to so construct the machine tool as to achieve highly efficient operation.

Other and further objects of the present invention will be apparent from the following description and claims and are illustrated in the accompanying drawings which, by way of illustration, show a preferred embodiment of the present invention and the principal thereof and what I now consider to be the best mode in which I have contemplated applying that principle. Other embodiments of the invention embodying the same or equivalent principle may be used and structural changes may be made as desired by those skilled in the art without departing from the present invention.

Figure 1A:
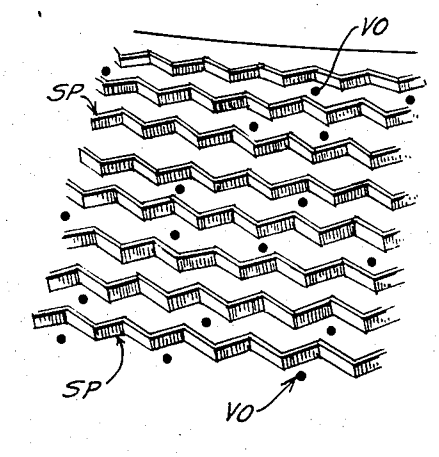
Figure 1B:
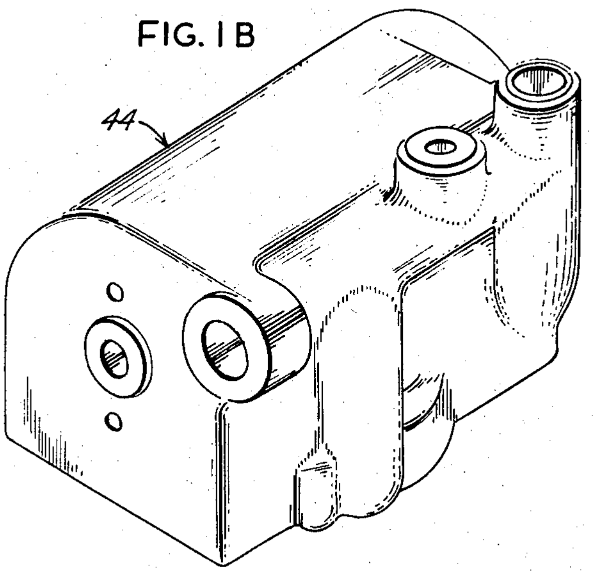
Figure 2:
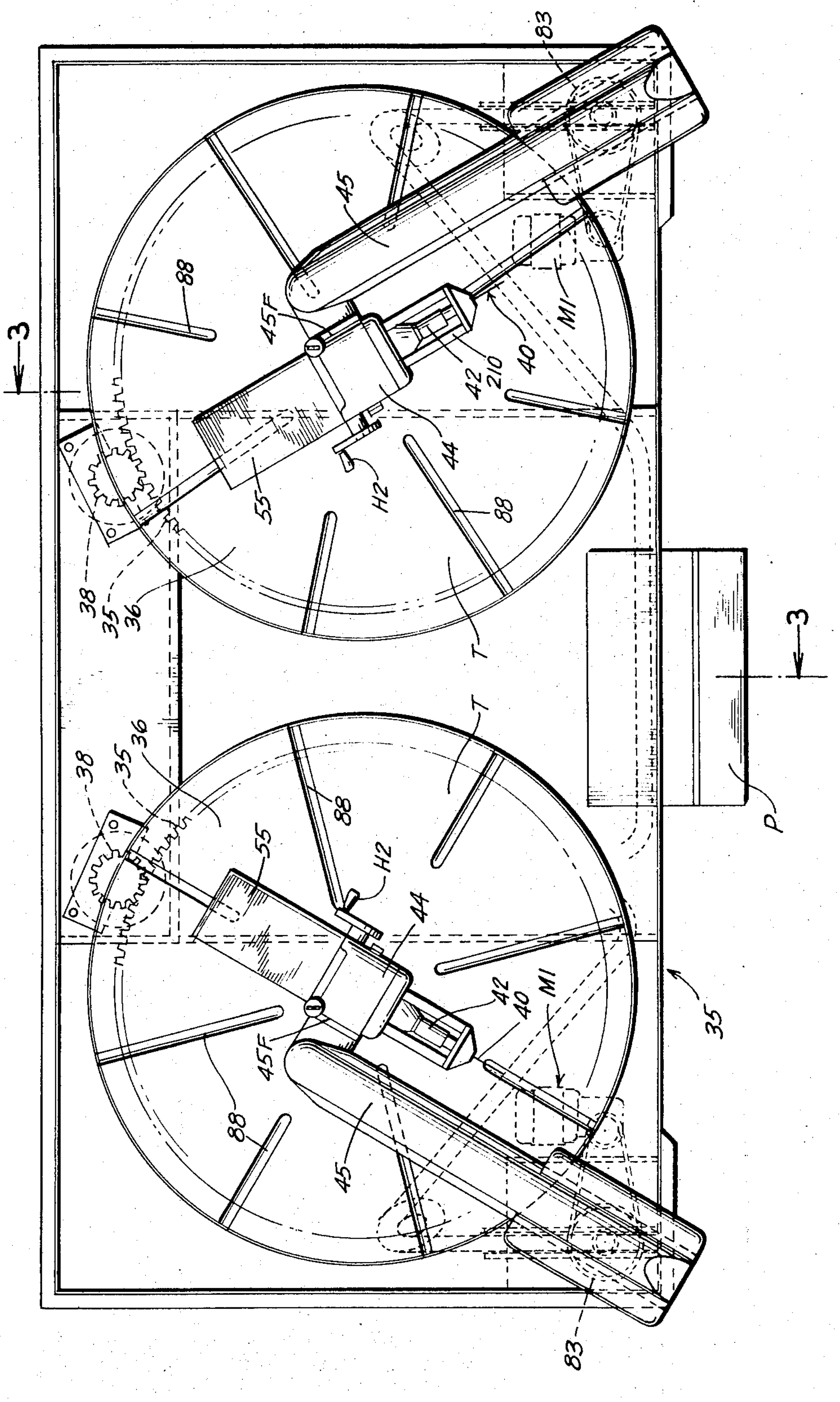
Figure 3:
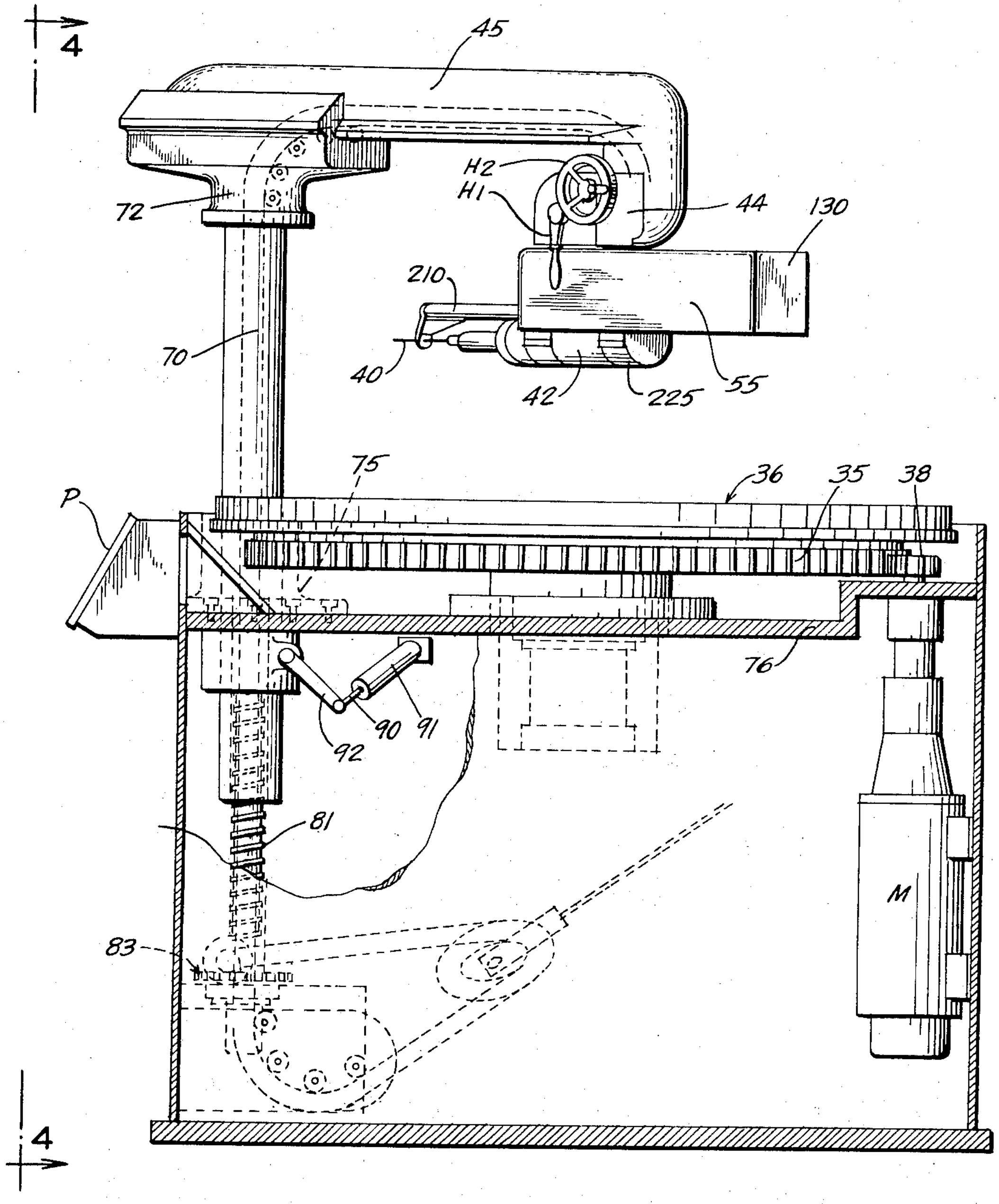
Figure 4:
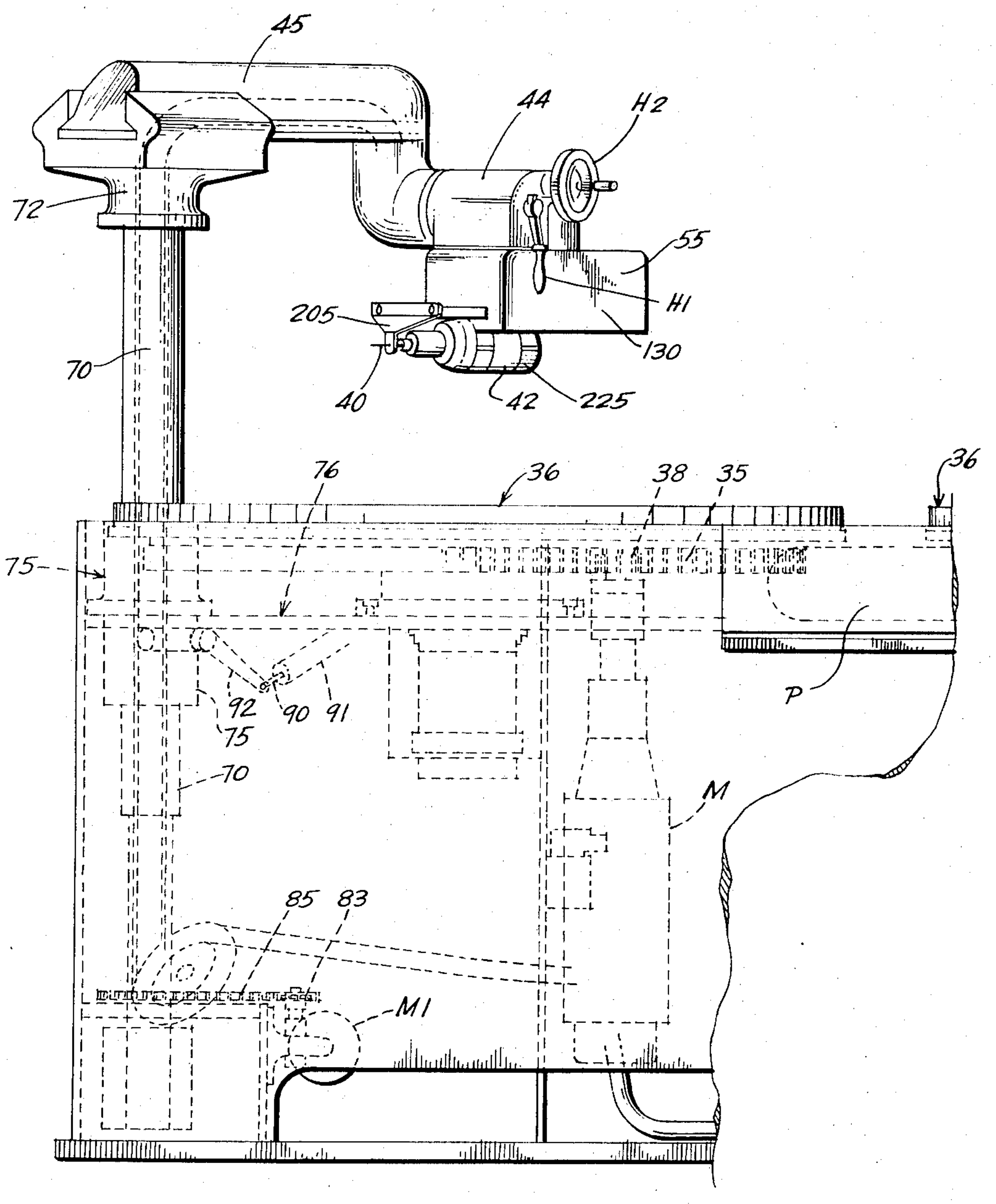
Figure 5:
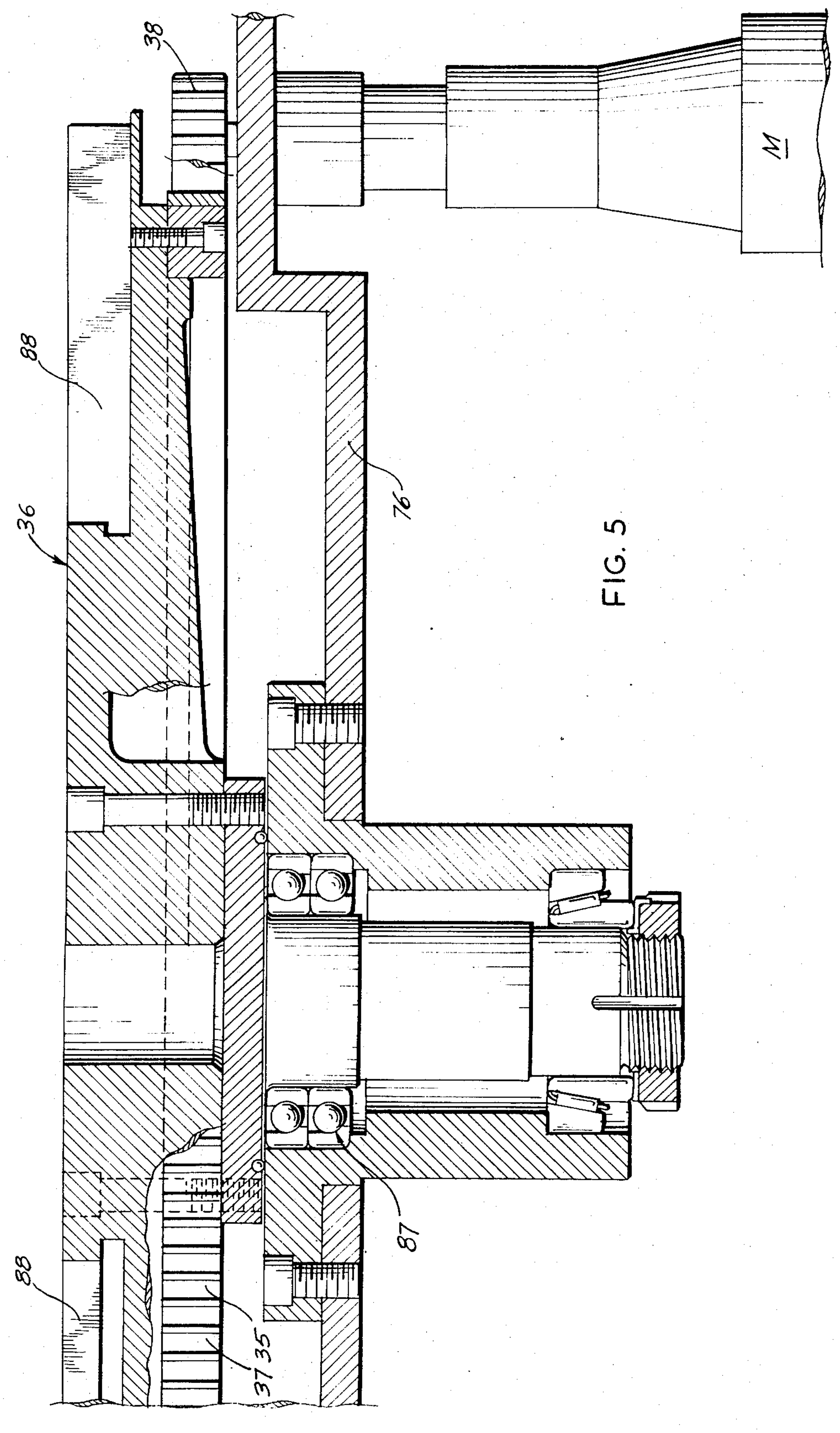
Figures 6, 8:
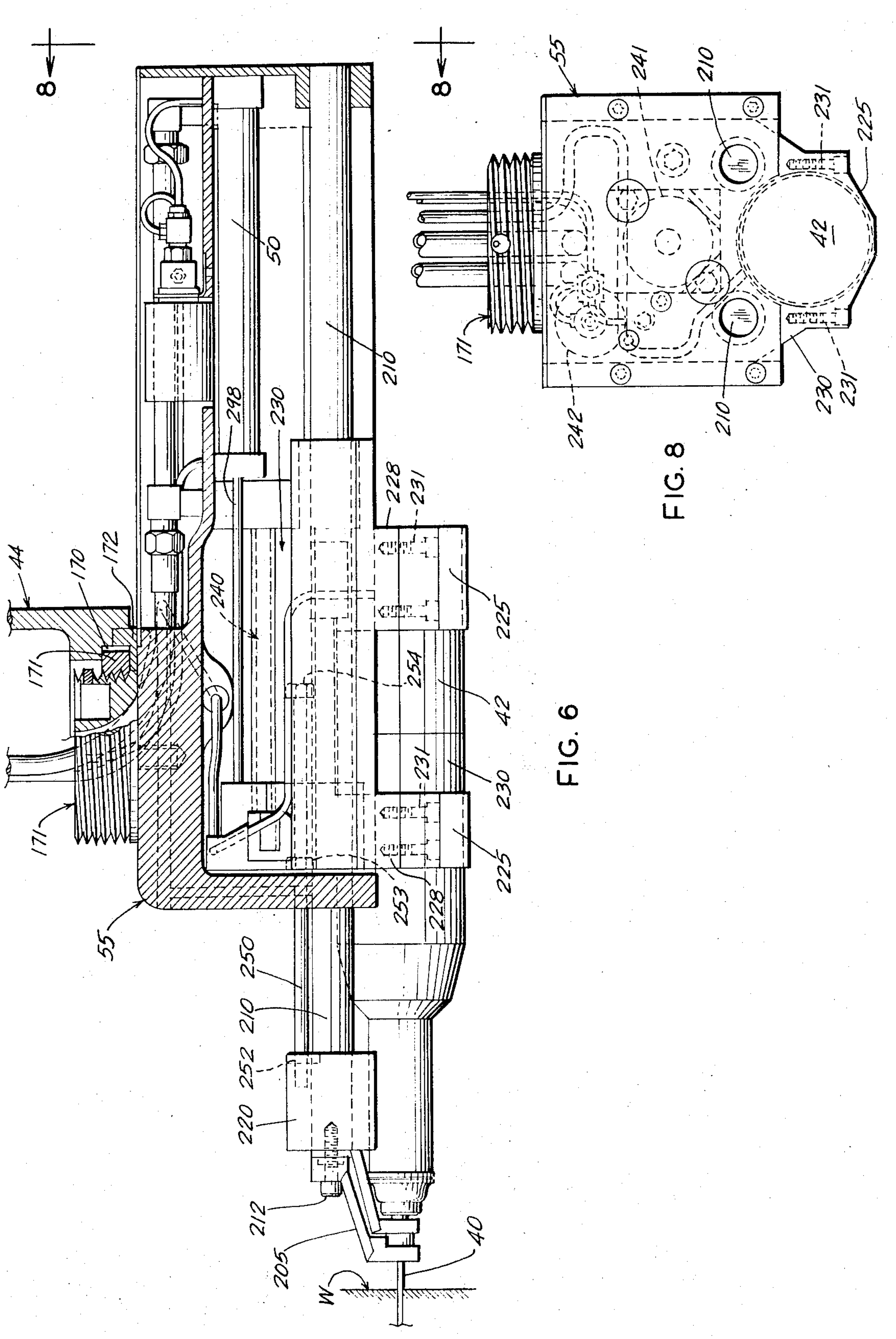
Figure 7:
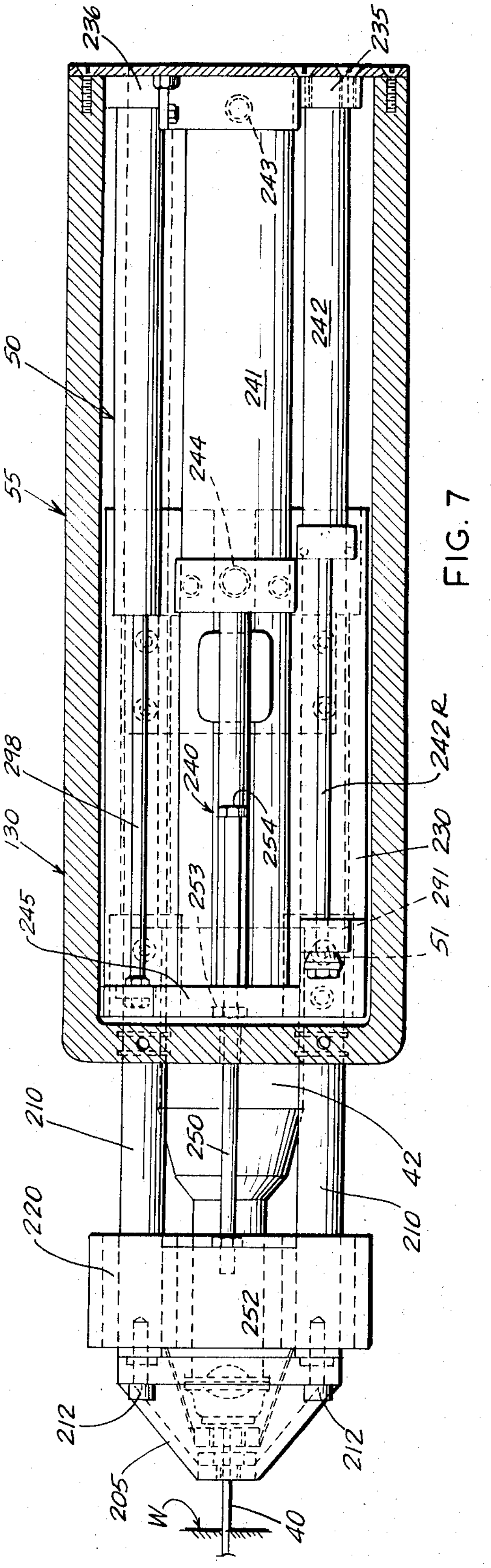
Figure 7A:
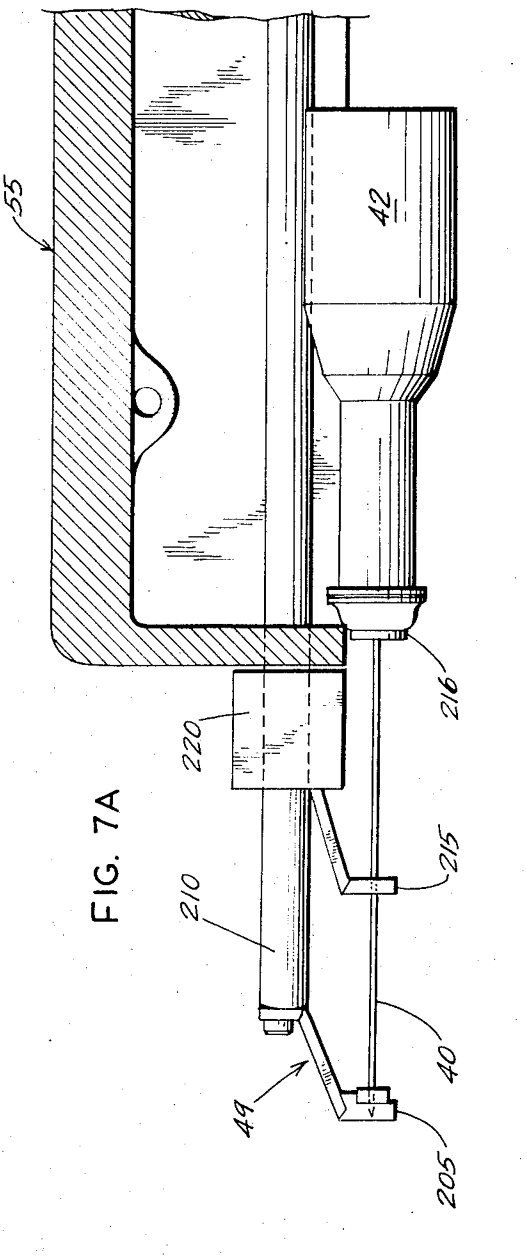
Figure 10:
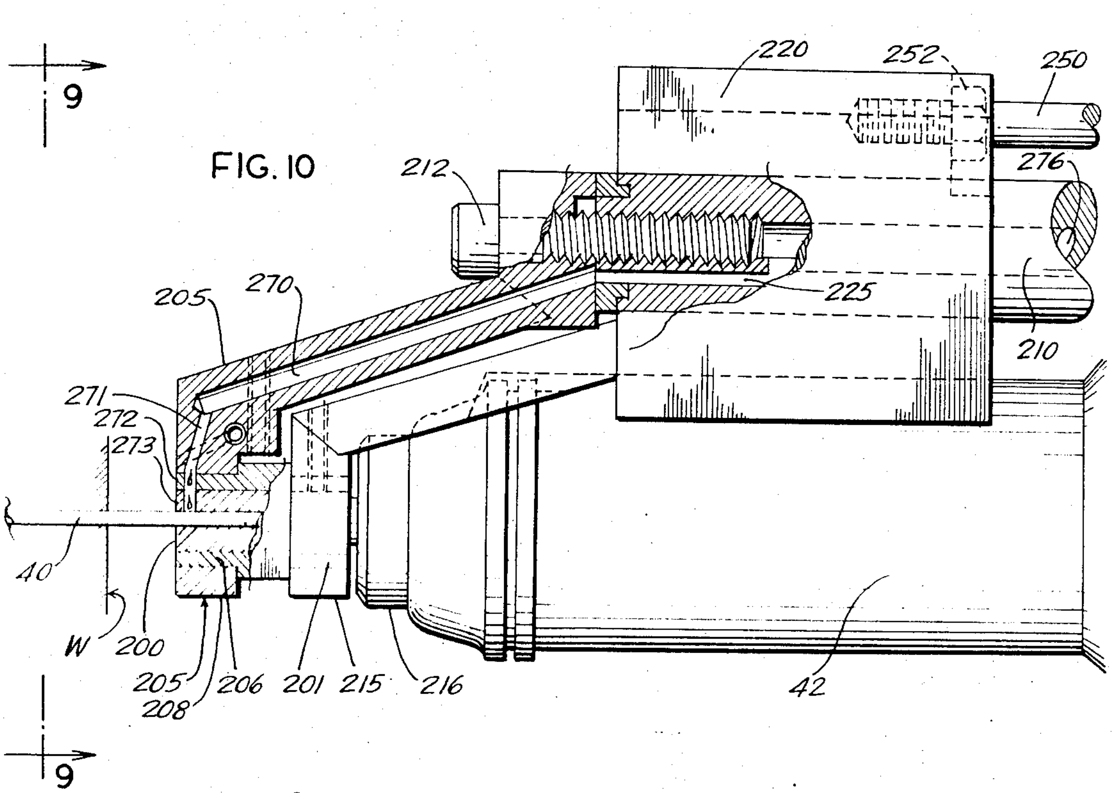
Figure 9:
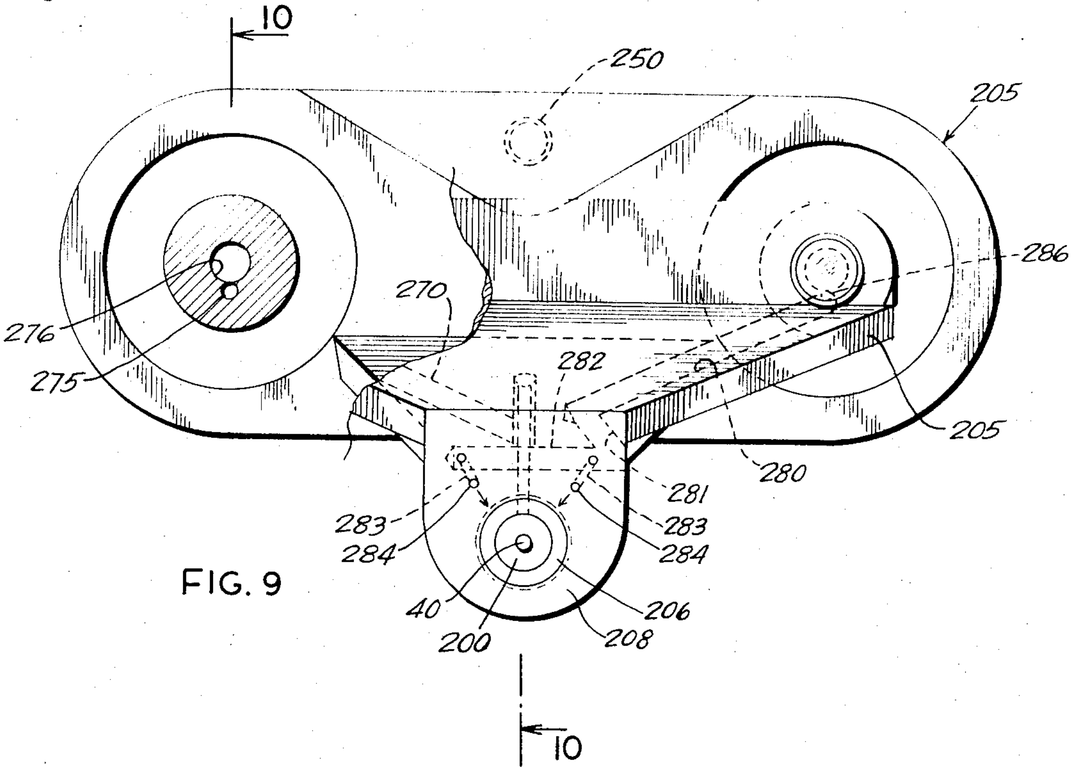
Figure 11:
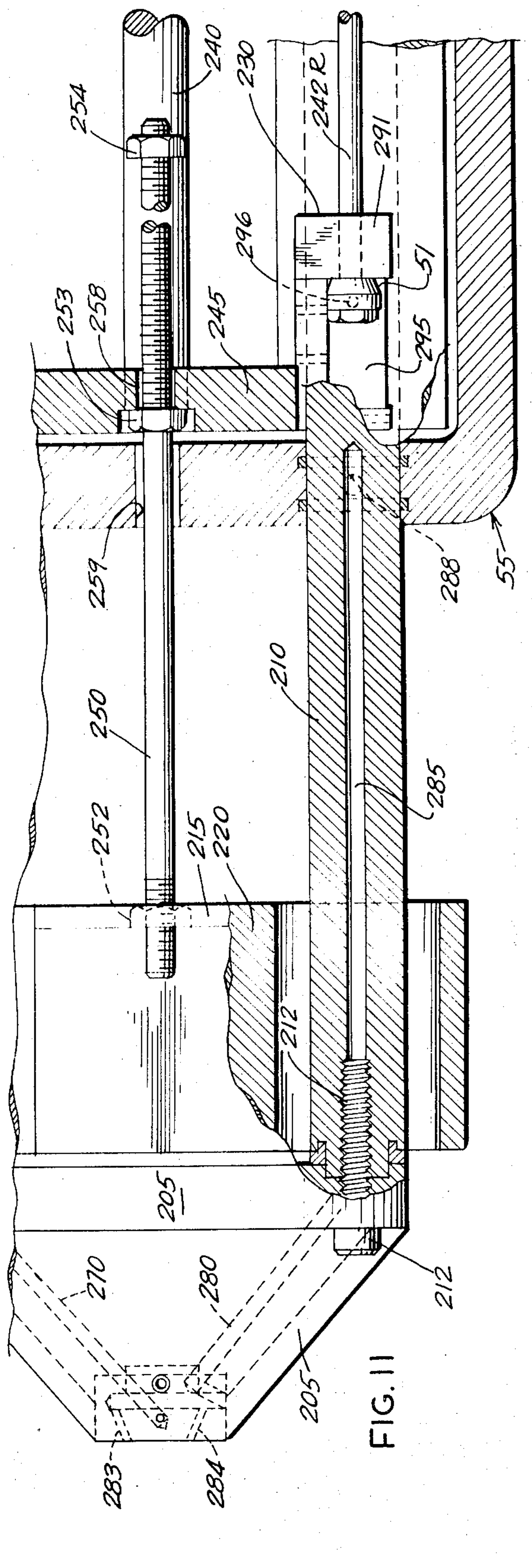
Figure 13:
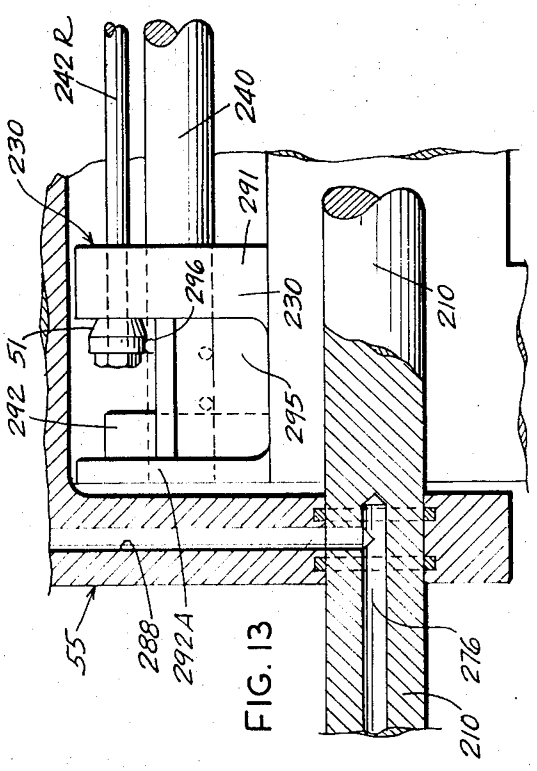
Figure 12:
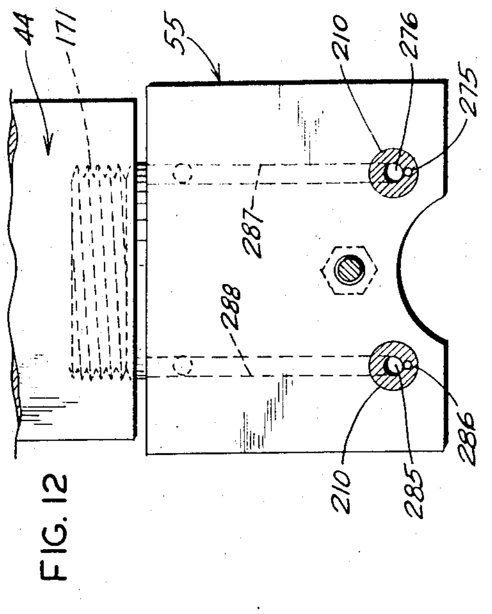
Figures 14, 15:
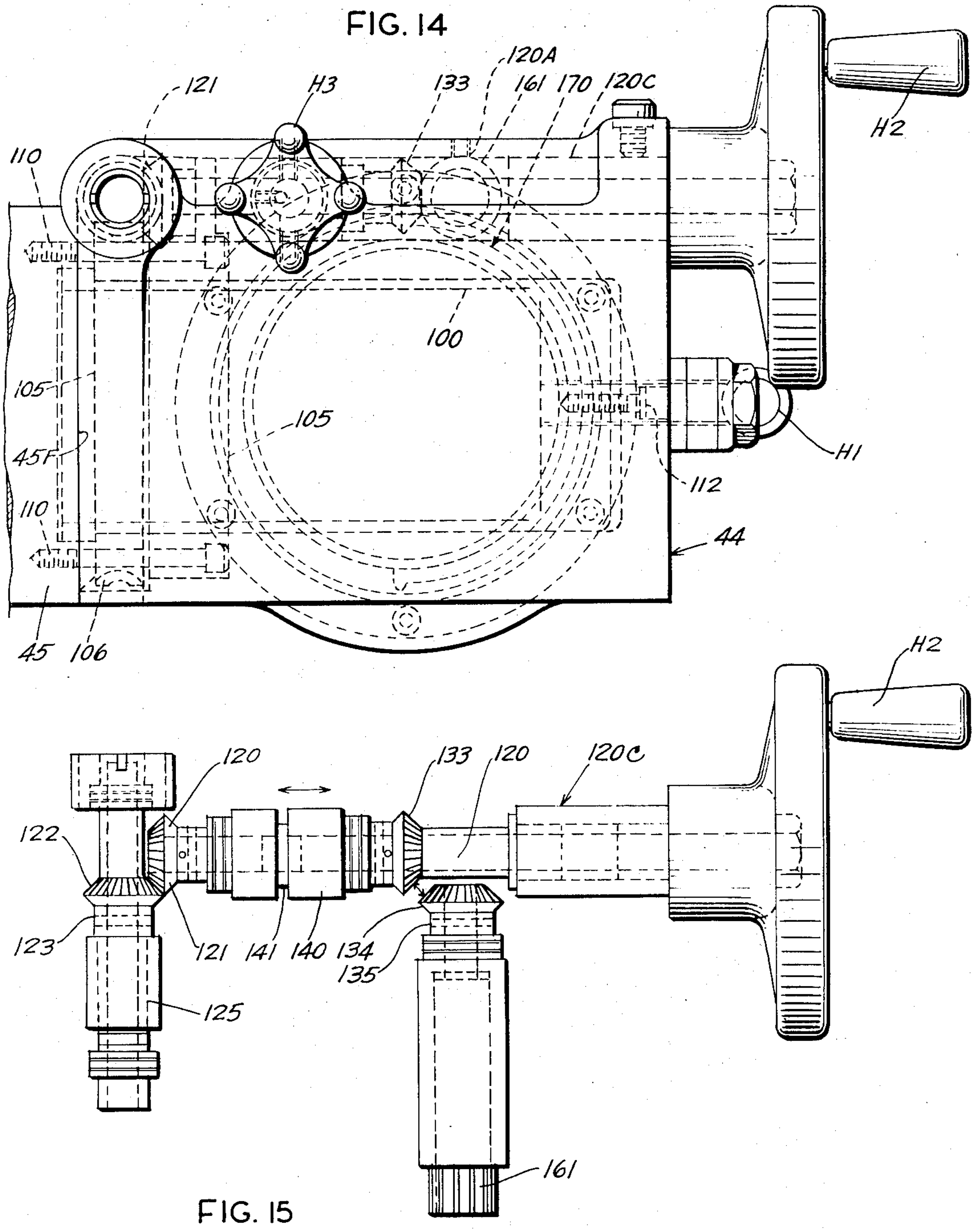
Figures 16, 17:
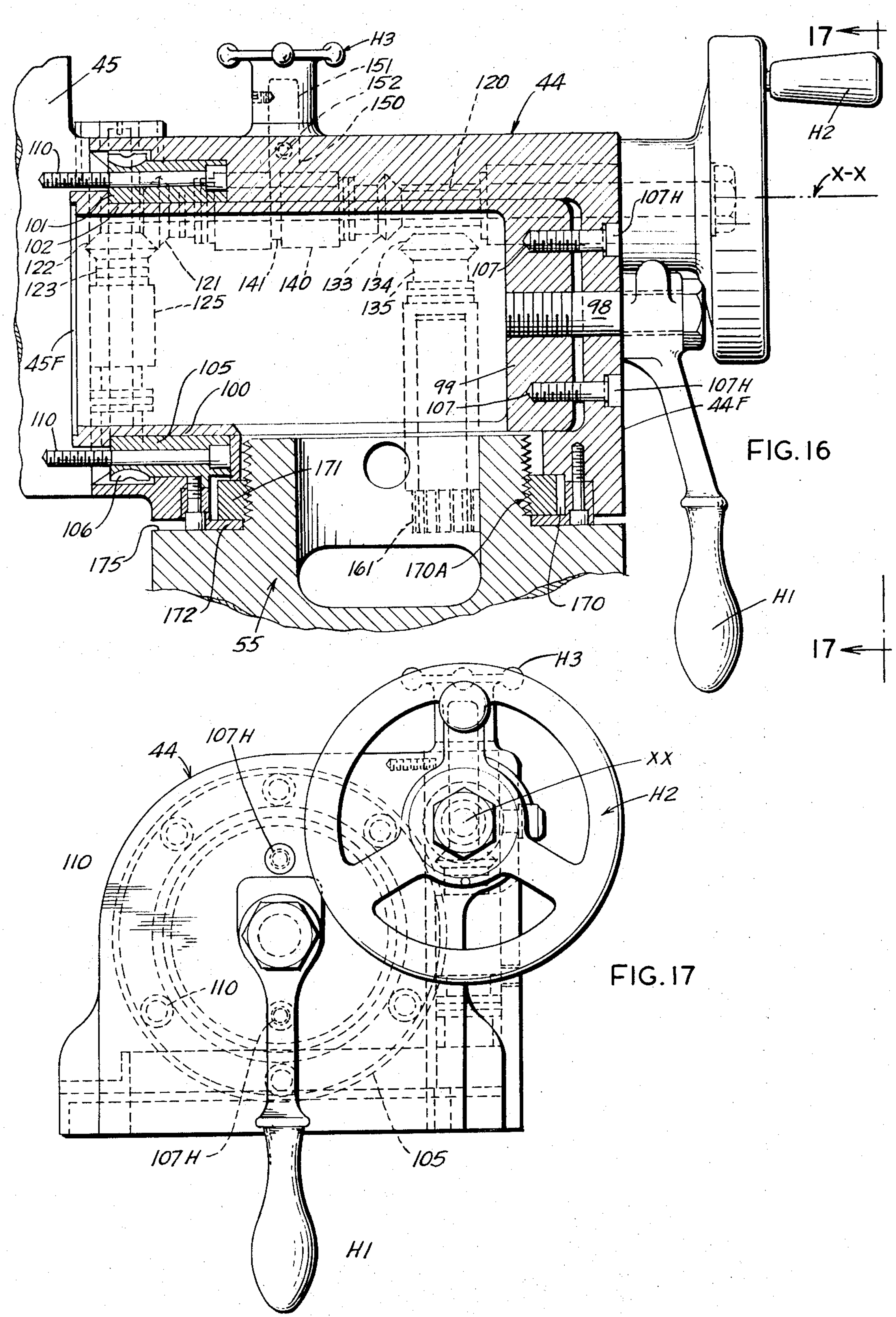
Figures 18, 19, 20, 21, 22:
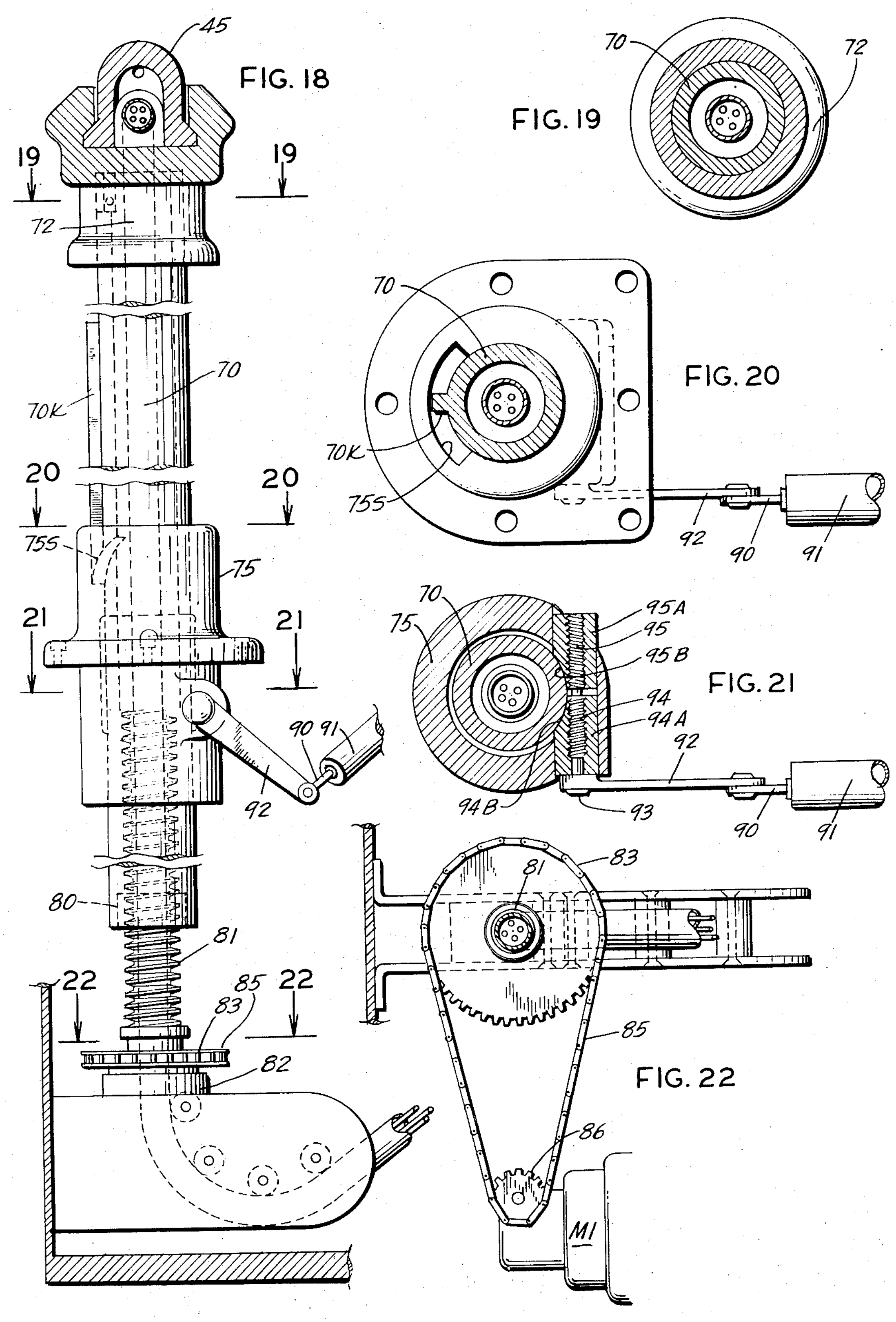
Figure 23:
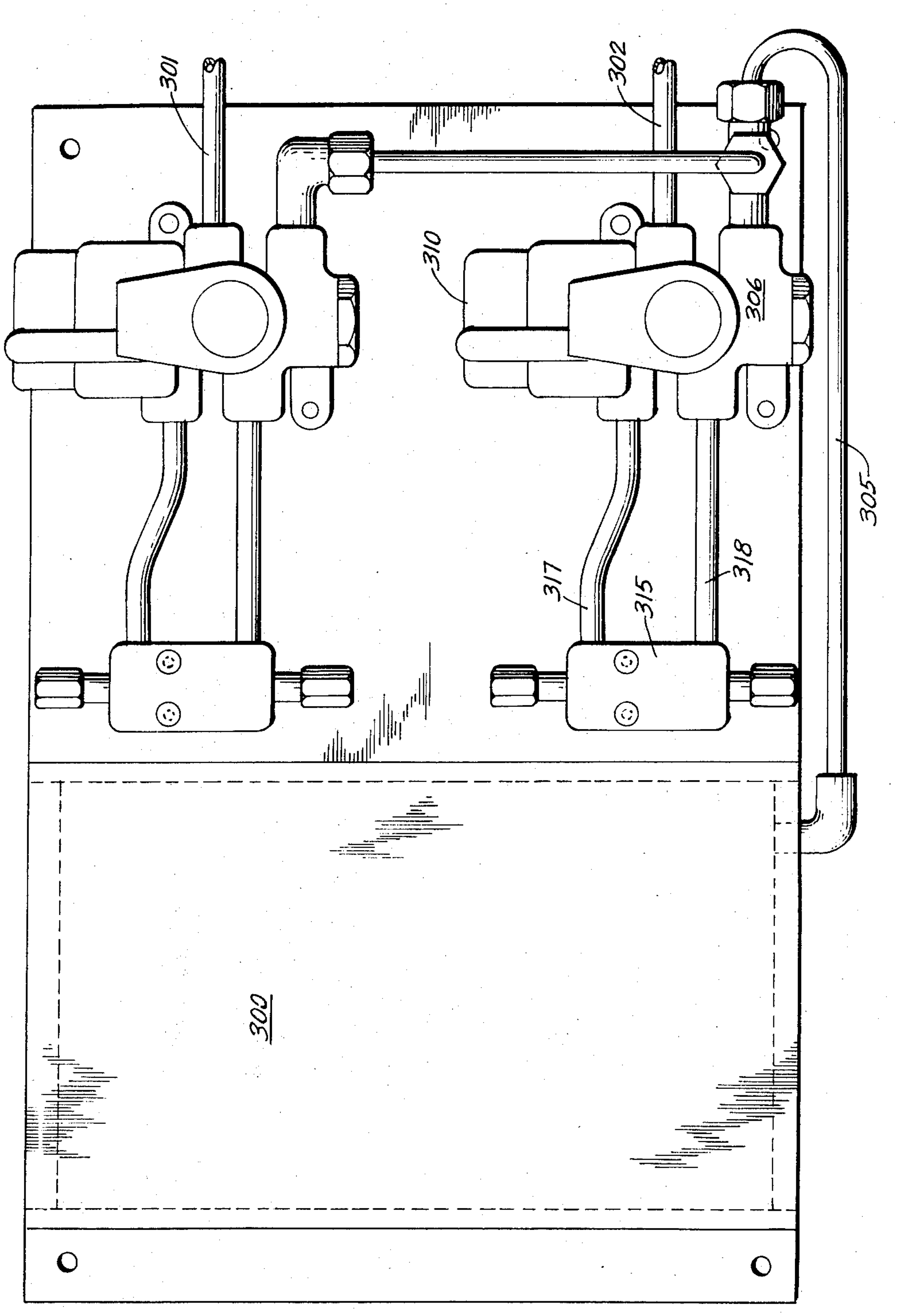
Figure 24:
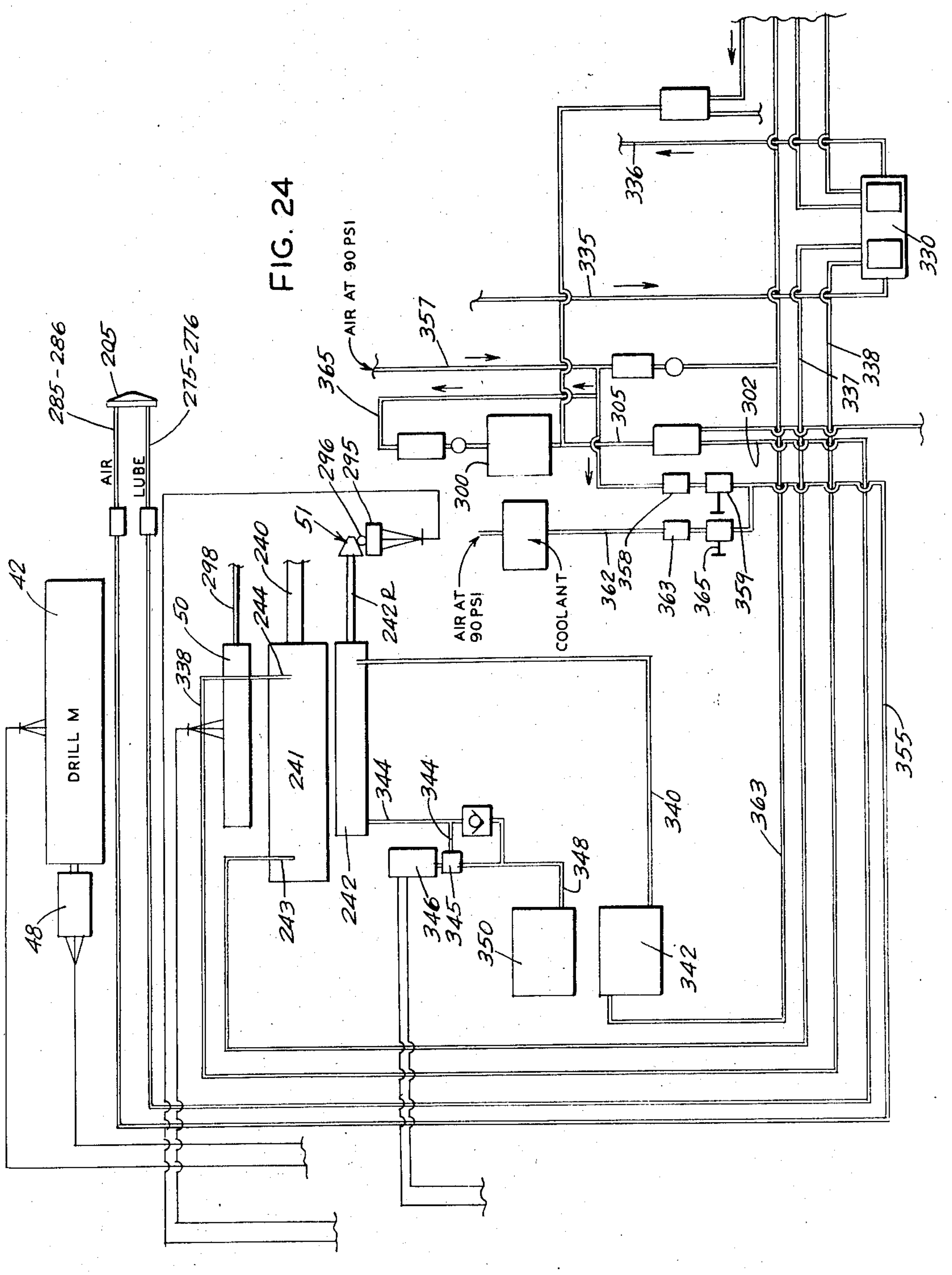
Figure 25:
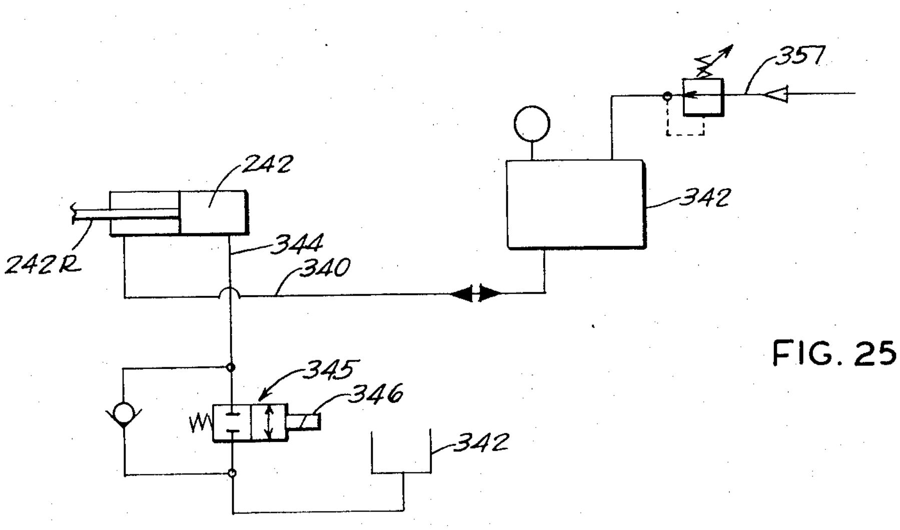
Figure 26:
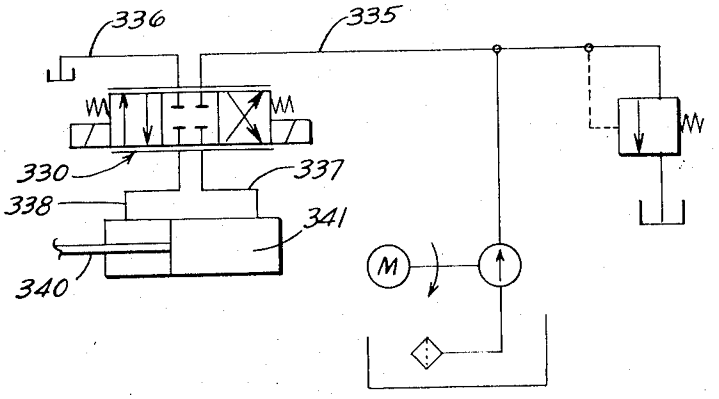
Figure 27:
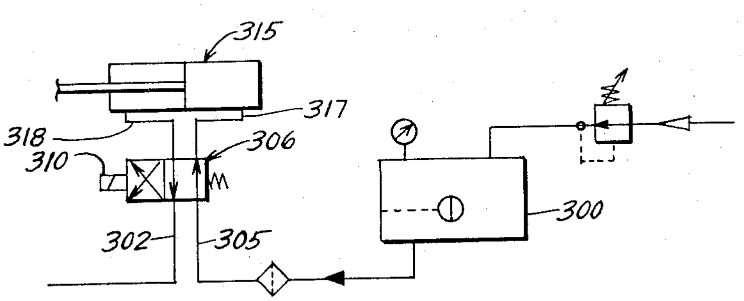

In the drawings:

FIG. 1 is a perspective view of a typical tire mold;
FIG. 1A is an enlarged fragmentary view of a portion of the mold shown in FIG. 1;
FIG. 1B is a perspective view of the head index;
FIG. 2 is a plan view of the machine tool;
FIG. 3 is a sectional view substantially on the line 3—3 of FIG. 2;
FIG. 4 is a side elevation on the line 4—4 of FIG. 3;
FIG. 5 is a sectional view on an enlarged scale of a fragmentary portion of the table on which the mold will be supported;
FIG. 6 is an elevation partly in section of the motor support and related parts;
FIG. 7 is another section of the motor support means and related parts;
FIG. 7A is a fragmentary elevation showing the retracted position of the drill;
FIG. 8 is an end elevation substantially on the line 8—8 of FIG. 6;
FIG. 9 is an end view on the line 9—9 of FIG. 10;
FIG. 10 is a fragmentary elevation partly in section on the line 10—10 of FIG. 9;
FIG. 11 is a plan view partly in section of a portion of the support means for the drill motor;
FIG. 12 is a fragmentary elevation, partly in section, of the head index and drill head;
FIG. 13 is a fragmentary sectional view of the drill head;
FIG. 14 is a top plan view of the head index;
FIG. 15 is a plan view of certain parts used for adjustment;
FIG. 16 is a fragmentary sectional view of the head index;
FIG. 17 is an end elevation substantially on the line 17—17 of FIG. 16;
FIG. 18 is a fragmentary sectional view of a column support;
FIGS. 19, 20, 21 and 22 are sectional views taken substantially and respectively on the lines 19—19, 20—20, 21—21 and 22—22 of FIG. 18, but on an enlarged scale;
FIG. 23 is an elevation of certain hydraulic control parts;
FIG. 24 is a diagrammatic plan of hydraulic circuitry and related parts; and
FIGS. 25, 26 and 27 are views of portions of the hydraulic circuit using JIC symbols.

GENERAL DESCRIPTION

While the machine tool of the present invention 35, FIG. 2, is specifically constructed to drill vent holes in a tire mold as TM, FIG. 1, it will be appreciated that other work pieces may be drilled by the present machine tool. In any event, the machine preferably includes two rotary tables 36, FIG. 2, in which two tire molds may be set and clamped in place, each table 36 including a ring gear 37, FIG. 5, adapted to be turned or indexed through increments by a pinion 38 driven by a table motor M.

There are also two drill assemblies each presenting a drill bit 40, FIG. 2, and a drill motor 42, FIG. 3. The drill motor is supported beneath a head index 44, and the head index in turn is carried by on over-arm 45 which can be raised and lowered and which can also be turned both to position the drill and to displace the drill from position above the table to enable the tire molds to be moved into position.

The head index 44 includes a handle H1, FIG. 4, which when loosened, enables the head index to be turned about a horizontal axis through a handle H2 to vary the angle of the drill insofar as working on a particular radius may be concerned.

The head index also includes a knob or handle H3, FIG. 16, which controls an eccentric, the purpose of which will be explained hereinafter.

Referring to FIGS. 6 and 7A, the drill motor 42 is supported for advancement and retraction on a common reciprocal axis. When the drill is fully retracted, FIG. 7A, means are effective to furnish lubricant to the tip of the drill and to furnish air to the drill for cleaning chips or turnings therefrom. A tachometer 48, FIG. 24, senses the rpm of the drill, and this tachometer in conjunction with other means to be described may at times sence conditions which manifest unacceptable high resistance of the work piece to the drill, whereupon the drill is retracted incidental to a new start and at the same time the tip of the drill is lubricated and cleaned.

Because the vent holes in a tire mold are relatively small, a necessarily small drill from the standpoint of diameter is used, but at the same time, a long drill bit is necessary. Therefore, the drill bit is constantly supported at its intermediate length in a positioning assembly 49, FIG. 7A, and this same positioning assembly is so constructed as to present the passages for feeding lubricant and air to the drill, which is an automatic occurrence at the time of full retraction of the drill whether retraction occurs as an incident to work piece resistance referred to above or whether retraction be at the end of a completed work cycle in which the vent hole is completed.

Additional sensing means in the form of a linear potentiometer 50, FIG. 24, is used to determine when the drill has made a complete penetration so far as concerns completion of a drilled opening and also to sense when the drill attains a full retracted position. Thus the linear potentiometer is a sensing means for controlling operations to be described hereinafter, and it should also be observed that the machine is equipped with a memory unit in the form of a cam 51, FIG. 11, which serves to constantly register the forwardmost position of the drill. Thus the cam 51 moves with the drill and its position is a measure of the amount of penetration of the drill into the work piece. If the drill is to be retracted because of exceptionally high resistance in the work piece, retraction as well as the subsequent stroke for a new start is to occur at a high rate of feed. This increases the production rate of the machine tool, but nevertheless, at the time of actual drilling feed is to occur at a more slow rate. The memory device 51 is effective to control these feed rates, and when the drill attains its former working position on a return stroke following intermediate retraction, the cam or memory device 51 is effective to reestablish a slow rate of feed or advancing rate of the drill.

The tire mold TM, FIG. 1, was initially present as a casting presenting the general contours. Then it was shaped on a boring mill in which were provided the various stepped diameters as D1 and D2 apparent in FIG. 1. Thereafter the mold was further completed by engraving techniques incidental to forming the various tread details TR, and following this the so-called sipes SP, FIG. 1A, were formed.

The present invention is concerned with one of the final stages of completion of the mold in which vent openings VO, FIG. 1A, are formed in the walls W and W1 of the mold which are necessary to proper vulcanization in the course of using the mold for curing the rubber which will form the tire. It should be noted that walls W and W1 are really opposed walls in the sense that wall W faces inward whereas wall W1 faces outward. To drill the front wall W, the drill will point outward as shown in FIG. 2, but to drill the back wall W1, the drill will have to be turned 180° to point inward toward wall W1.

Heretofore these vent openings were completed by hand operation which is a slow and tedious process, and moreover, a great deal of cost was encountered as the result of breaking the drills. Thus, in hand operation the workman himself manipulates a portable hand tool which rotates the drill bit, but when resistance is encountered in the course of forming a vent opening, the workman cannot necessarily sense the circumstance where resistance to torque is so severe as to produce a broken drill bit.

Furthermore, in the instance of manual drilling, no practical means is available to lend support to the long portion of the drill bit between the end portion gripped in the chuck and the drill end which is performing the desired drilling operation. Under the present invention, a constant support is presented so that at no time is more than one-half the length of the drill bit unsupported.

While the cost of replacing drill bits may itself seem minimal compared to the cost of the present machine, a broken drill bit under manual operation is only a manifestation of slow production. Thus, not only is time consumed in extracting the broken bit and replacing a new one, but necessarily the workman will operate the manual tool at a slower rate in an effort to avoid a broken bit which itself can be dangerous. Thus, the time element is one factor of several contributing to high cost all of which are obviated under the present invention which entails a machine which will enable tire molds to be produced at a rate about three times that heretofore so far as concerns the drilling of vent holes in the tire mold.

Referring to FIG. 2, the bed of the machine is capable of handling two work pieces simultaneously, one being supported on each table 36. The two tables are identical in construction and operation, and this is equally true of the drills, their operation and their supporting means. Therefore, the construction of the machine will be described in terms applicable to either table 36 and either drill unit.

The Supporting Column

As shown in FIG. 3, which illustrates in end elevation one-half the whole construction of the machine as viewed in FIG. 2, it will be observed that the drill motor 42 depends from a drill head 55 normally positioned above the table 36 and itself depends from the head index 44 which in turn is connected to arm 45 supported in cantilever fashion at the upper end of a sleeve-like column support 70. As will be described hereinafter, the drill head may be turned 180° horizontally about a vertical axis to accommodate the requirement that either of two opposed walls of the mold may have to be drilled with vent holes. Furthermore, since the drill may be required to work at several different diameters of one wall, the head index itself may be tilted about a horizontal axis so that the drill may engage a wall of the mold from virtually any selected angle.

The horizontal arm 45, FIG. 18, is clamped in a collar 72, which in turn is pinned to the upper end of the vertical support column 70 so that the arm 45 can be both swung and elevated or lowered with corresponding movement of the sleeve 70. The sleeve 70 includes a key 70K adapted to fit into a key slot 75S formed in a collar 75 which itself is clamped to the main stationary horizontal bed 76, FIG. 4, of the machine tool.

The column 70, FIG. 18, extends through and beyond the stationary collar 75 and is provided at the lower end with a fixed nut 80. The screw 81 is extended through the nut, coaxial with column 70. The lower end of the screw 81 is supported for rotation in a thrust bearing block 82. The screw adjacent the lower end is provided with a sprocket 83 adapted to be turned by a chain 85, the chain 85 in turn being driven by a sprocket 86 representing the output or drive of a reversible, two speed (variable speed) motor M1, FIG. 22. Thus, when the motor M1 is energized the screw 81 will turn, and depending upon the direction of rotation, the sleeve 70 will be accordingly raised or lowered.

Assuming the cirumstance to be that shown in FIG. 2 where the drill head 55 and head index 44 are centered over the table T and that tire molds are to be set in position, the motor M′ will be so driven as to turn the screw 81 to raise shaft 70 eventually disengaging the key 70K from the key slot in the collar 75. It is then possible to turn each arm 45 to a position which exposes the tables T so that the tire molds may be set thereon.

Referring to FIG. 5, the table 36 is bolted to the ring gear 37 by which the molds or other work pieces to be drilled may be indexed to the various radial positions where vent holes are to be drilled therein. The ring gear 37 is driven through the pinion 38 in turn driven by the table motor M. As also shown in FIG. 5, the bed 76 serves to support a roller bearing assembly 87 which anti-frictionally supports the table 36.

The table 36 is formed with a plurality of radially extended slots 88, FIGS. 2 and 5, and these slots serve as guides for the heads of a plurality of T-bolts (not shown) which serve to rigidly clamp the tire mold to the table 36. After a tire mold has been set in place on the table T, the mold is "trued up" or accurately oriented through the media of indices on the table, although other registering means may be used. This initial positioning is merely one of orientation, and has nothing to do with the true starting position to which reference will be made hereinafter.

After the molds have been clamped on the corresponding tables, the arms 45 are swung back into position over the mold and the key 70K is approximately aligned with the key slot 75S. The motor M1 is then reversed to in effect retract the nut 80 causing the sleeve 70 to be gradually lowered. It will be observed that the key slot 75S is formed to present a rather wide opening, almost 90° in arc, and the sides thereof are sloped downward and inward so that as the column 70 is lowered the key 70K will be accurately guided into the narrow portion of the key slot into which it neatly fits. Thus the key is returned to the key slot whereby sleeve 70 is in effect locked in position against rotative motion and of course the friction presented by the idled motor M1 prevents any rotation of screw 81 and consequent vertical movement of column 70.

It may be mentioned that the screw 81 will in effect be stopped when the drill is lowered to the desired operating diameter of the work piece on table 36.

Means are provided to lock column 70 in the position to which it was lowered as just described, and such means are operated by a piston 90 in an air cylinder 91, FIGS. 3, 18, 20 and 21. The cylinder 91 is supported at the underside of the bed 76 of the machine, as shown in FIG. 3, and its piston 90 is pivotally connected to the lower end of a brake operating arm 92. The operating arm 92 has a shaft 93 fixed thereto, and this shaft is turned to present a pair of left and right hand screws 94 and 95 as shown in FIG. 21. These screws in turn are mounted in internally threaded bores in a pair of brake segments 94A and 95A free to slide within the collar 75 which is clamped to the bed of the machine as mentioned above. The brake shoes or segments 94A and 95A are formed with curved faces 94B and 95B adapted to fit a portion of the outer circumference of column 70.

When the column 70 is to be raised to disengage key 70K from the key slot 75S, the piston 90 is retracted and the two screws 94 and 95 are turned to free the brake elements 94A and 95A from shaft 70. After the shaft or column 70 has been lowered to its working position described above, the air cylinder is actuated to advance piston 90 which, in effect, tightens the two brake elements on column 70 thereby holding column 70 in a fully locked position.

THE HEAD INDEX

As noted above, the head index 44 may be turned on a horizontal axis to present the drill bit to the diameter of the wall of the mold where vent openings are to be formed in the desired spaced relationship in a circumferential sense. There are, of course, circumstances where the drill can be presented to the desired diameter merely by raising or lowering column 70. Yet further, there may be circumstances where different diameters may be worked on by the drill merely by positioning the head index about its horizontal axis. But more likely than not, the configuration of the tire mold may present a geometry which will match neither circumstance alone, requiring vertical movement of the column 70 as well as tilting of the head index about its horizontal axis in order to match the arc of the tire mold presenting the diameter where the vent holes are to be drilled.

Referring to FIG. 16, a fully locked position of the head index 44 is normally maintained by handle H1 in locked position. When the head index is to be moved, handle H1 is appropriately turned, turning a screw shaft 98 having a threaded connection to the head 99 of a sleeve-like clamp 100 which at one end is formed with a rabbeted shoulder 101 normally in tight engagement with one face 102 of a worm wheel 105 having a worm thread 106. The sleeve 100 fits within the head 44 and the two are non-rotatably related by bolts 107 having heads 107H mounted in the outer face 44F of the head 44. It will be observed in FIG. 16 that there is a slight amount of clearance between the underside of the bolt heads 107H and the bottom of the sockets in which they are located.

The worm wheel 105 is fixed and stationary at all times. Thus, the worm wheel, FIG. 16, is secured against rotation by bolts 110 to one of the end faces 45F of the over-arm 45, and when the shoulder 101 of sleeve 100 is drawn up tightly against the worm wheel by a tightening turn of handle H1, sleeve 100 in effect locks the head index 44 through bolts 107. That is, the head index is locked in a rotative sense, although the bolts 107 are free to move axially enabling the locking sleeve 100 to be moved by screw 98 in an axial sense as viewed in FIG. 16 incidental to clamping and unclamping the sleeve 100 with respect to the worm wheel 105. The worm wheel, as a stationary gear fixed to the arm 45, is engaged by a travelling gear carried by the head index, to adjust the head index as will now be described.

When the sleeve 100 is thus released with respect to the worm wheel, it is then possible to use handle H2 to rotate the head index 44 circumferentially about the axis of screw 98 incidental to tilting the drill 40 to a different angle. To this end, a rotatable driving shaft 120, FIG. 15, is arranged to rotate with the wheel of handle H2 and extends longitudinally of the head index parallel to the lock sleeve 100. The end of shaft 120 opposite the handle H2 carries a bevel gear 121 normally meshed with a bevel gear 122. The bevel gear 122 is carried on a shaft 123 which in turn has a worm gear 125 fixed thereto. Both shaft 120 and shaft 123 are supported for rotation within the head index.

The worm gear 125 is a head index adjusting gear and is meshed with the worm wheel 105. The worm wheel, being fixed, constitutes a rotary track for the worm gear. Thus, when sleeve 100 has been freed as above described, handle H2 may then be turned, turning shaft 123 through the engaged bevel gears 121 and 122, rotating the worm gear. The worm uses the worm wheel as a track and accordingly the head index 44, FIG. 17, is forced to turn about axis XX, FIGS. 16 and 17, as a center. In this way the drill 40, FIG. 4, may be tilted at an angle other than horizontal. When the desired angle for the drill bit has thus been achieved, handle H1 is then turned in a tightening direction bringing the rabbeted shoulder 101 inwardly tight against the worm wheel and thereby locking the head index against any further rotative motion.

It was mentioned above that the tire mold may present a back wall W1 to be formed with vent openings. This would entail having the drill 40 point toward the observer, rather than away from the observer, as viewed in FIG. 3. To enable this to be accomplished, means are provided to first drop slightly the suporting head 130 which carries the drill unit. Thus, and again referring to FIGS. 14 through 17, the same shaft 120 which carries the bevel gear 121 also carries a bevel gear 133 adapted to be meshed with a bevel gear 134 carried on a rotatable driven shaft 135 disposed parallel to shaft 123 within the head index.

Shaft 120 is adapted to slide to disengage bevel gear 121 from bevel gear 123 while establishing engagement between bevel gears 133 and 134. To this end, a sleeve 140, FIG. 15, having a medial groove 141 therein is located on shaft 120 between the two bevel gears 121 and 133. Shaft 120 carries a spacer 120C. A set screw 120A normally holds collar 120C stationary.

A stud 150, FIG. 16, is positioned eccentrically at the lower end of a positioning shaft 151 fixed to handle H3 to rotate therewith. Stud 150 reposes in groove 141 of sleeve 140. The position of the handle H3 is one of two positions, either position being normally maintained by a spring loaded ball detent 152. Thus by turning handle H3 with sufficient force to overcome the holding action of the spring detent, shaft 151 will turn and the eccentric stud 150 will shift collar 140 and shaft 120 to engage the two bevel gears 133 and 134. Then when sleeve 100 has been unlocked through appropriate turning of handle H1, turning of handle H2 will cause bevel gear 133 to rotate bevel gear 134, turning shaft 135.

Shaft 135 carries a pinion 161, FIG. 16, for adjusting the tool support head. The pinion 161 is meshed with a ring gear 170, FIG. 14, having external teeth 170T, FIG. 16, engaged by the teeth of pinion 161 and an internal thread 170A related to a nut 171 carried at the upper end of the tool support head 55. The ring gear 170 is rigidly secured to the underside of the head index by a bolted clamp ring 172. Ordinarily bevel gears 133 and 134 are disengaged with the shoulder 175 of the drill head 55 drawn up tightly against the underside of the clamp ring 172. When, however, the two gears 133 and 134 are meshed and handle H2 appropriately turned, rotation of the tool suport head adjusting gear 170, through nut 171, causes the head 55 to be lowered, producing separation between the shoulder 175 and the clamp ring 172. This being so, the drill support head 55 is in effect freed from the head index 44 and may be turned through 180°, and again appropriately spaced locking or holding detents (not shown) are provided between the head index and the drill head to position the drill unit in either of one of two selected 180° positions.

The height, angularity and working direction of the drill having now been set, the table T holding the work piece can be indexed to its zero or starting position. This is accomplished through a so-called jog operation, the starting position for the first vent hole being a predetermined one depending upon specifications. The present machine is equipped with a panel P at the front of the machine housing, FIG. 2, on which is located the various buttons for sequencing and automatic operation, and the table may be positioned as an incident to depressing the so-called "rapid jog" button (150 inches per minute) or a "jog feed" button which itself can be set for any increment of table feed up to 150 inches per minute. There is also a "jog increment" feed button, providing 0.005 inches of arc for each actuation of the jog increment button. Details of this aspect of the present disclosure are not necessary to an understanding of the mechanical functions involved since the ultimate effect of jogging is to energize the table drive motor M to produce increments of rotation of the pinion 38, FIG. 5.

In any event, the table 36 is indexed to its start position, and under this circumstance the point of the drill 40 is opposite the precise point of the mold wall that is to be penetrated by the drill bit in forming the first of many vent openings.

The Drill Head

Details of the drill head or unit are illustrated in FIGS. 6 through 13. In FIGS. 6, 7 and 10, the drill unit is shown under the circumstance where the drill 40 has been advanced to its forwardmost penetrating position ("high limit") with regard to the tire mold. In FIG. 7A, the drill unit has been fully retracted ("low limit"). During reciprocal movement of the drill, the drill head 55 remains stationary, of course, and serves principally as a guide for a drill motor support carriage as will be explained. In this connection it will be observed that the drill bit is constantly supported by two support bushings 200 and 201, FIG. 10. The outer support bushing 200 is part of an end support 205 which is fastened to a pair of parallel, laterally spaced guide rods 210, FIG. 7, resort being had to screws 212 for thus establishing a fixed connection between the end support 205 and the guides 210. The guide rods 210 are rigidly secured in the drill head casting 55 and include portions extending outboard thereof, FIG. 7, on which the end support 205 is located.

The support bushings 200 and 201 are formed with apertures, FIG. 10, which closely approximate the diameter of the drill bit, thereby supporting the drill against bending while permitting free rotation. Bushing 200 is replaceable and is carried in a sleeve 206, FIG. 10, which in turn is carried in the bore of an ear 208, FIG. 9, at the forward end of the end support 205. Bushing 201 is carried in a second support 215 which is part of a float 220, FIG. 7A, which spans and is free to shift longitudinally relative to the two guide rods 210. The end support 205 is formed with internal passages enabling oil and air to be fed to the drill as will be described hereinafter.

The drill bit is clamped in the usual chuck 216 driven by motor 42, and this motor at the underside is encompassed by a pair of straps 225, FIG. 6, which are in the nature of split segments adapted to mate with corresponding lugs 228 which are part of a one-piece drill motor support carriage 230, bolts as 231 serving to connect the straps 225 to the lugs 228 so that the motor is in effect united with the motor carriage 230 for movement therewith.

As shown in FIG. 8, the motor carriage 230 is formed with apertures through which extend the guide rods 210 so that the motor carriage is free to slide on the guides 210.

The motor carriage 230 is reciprocated by a rod 240, FIG. 7, in a main cylinder 241, the cylinder 241 being rigidly mounted within the cavity defined by the casting which affords the head 55. This casting also houses a second cylinder 242, and this cylinder controls a rod 242R on which is mounted the cam 51 as will be described below.

The cylinder 241 at one end has an inlet 243, FIG. 7, for fluid under pressure to advance the drill support carriage, and at the opposite end has an inlet 244 for fluid under pressure to retract carriage 230. The end of the rod 240 opposite the end in the cylinder 241 is threadedly secured to a forward cross plate 245, FIG. 7, which is part of the motor carriage 230. Thus, reciprocation of the piston rod 240 characterizes corresponding motion of the motor support carriage 230 which carries motor 42 for the drill and which itself reciprocates on the guides 210 supported by head 55.

As shown in FIG. 11, a connecting rod 250 extends in both directions through the end plates 245 of carriage 230. In FIG. 11 the carriage 230 is in a position corresponding to the greatest penetration (high limit) of the drill bit. The rod 250 is in effect joined to the bushing support 215 by a nut 252 seated in the bushing float or slide 220. A pair of nuts 253 and 254 are threaded in spaced relation on the opposite end portion of the rod 250. The rod 250 passes through a clearance hole 258 in the carriage cross plate 245 and through a clearance hole in the drill head 55.

When the carriage 230 is retracted to retract the drill, the support 215 for the bushing 201 will stay where it is (FIGS. 10 and 11) until the carriage end plate 245 strikes the nut 254, the latter being in an adjusted position. On the next advancing or return stroke there will be no forward motion of the bushing support slide 215 until the cross plate 245 picks up nut 253. This characterizes that aspect of the present invention having to do with the fact that at least one-half the length of the drill 40 will always be supported.

It is of course important to effective machining to furnish lubricant to the tip of the drill. The drilling of vent holes as this was done previously by manual operation required the workman to withdraw the drill bit periodically to dip the drilling end in lubricant. Under the present invention, lubricant may be automatically furnished to the drill end on each retraction, and referring to FIG. 10, it will be observed that the end support 205 is formed with an oil passage 270–271 which leads to a pair of aligned passages 272 and 273 in the bushing assembly whereby oil is permitted to drop onto the drill end when the end of the drill is retracted thereto (FIG. 7A) in a manner to be explained. Oil is fed to the passage 270 in the end support casting 205 through a small passage 275, FIG. 10, formed in the related one of the guide rods 210, the passage 275 communicating with a central passage 276 formed on the axis of the guide 210. Oil is furnished under pressure to the passage 276 in a manner to be explained.

Air is furnished or directed to the drill bit to clean chips, and to this end the support 205 is formed with a second longitudinal passage 280, FIG. 9. The passage 280 is angularly directed at 281–282 as shown in FIG. 9 to afford a manifold to which is connected to smaller air passages 283 presenting a pair of spaced openings 284 at the outer face of the end support 205, whereby air under pressure may be fed along two convergent paths directed toward the shank of the drill bit. As in the instance of the guide 210 which has the oil passage, the other guide 210, FIG. 12, is formed with a similar passage 285 enabling air to travel axially therethrough and into a smaller axial passage 286 formed therein which communicates with the passage 280, FIG. 9.

Again referring to FIG. 12, the oil passage 276 is fed by a passage 287 and the air passage 285 is fed by a separate passage 288 respectively formed in the head 55. Thus, the head 55 may be used as a manifold in this sense, and oil is supplied to the passage 287 from a reservoir incorporated in the machine. The air passage 288 may be fed by a conduit connected to any convenient source of air under pressure. Supply is easily achieved by conduits led down through the opening in nut 171 as shown in FIGS. 6 and 8.

Retraction of the Drill to Its Low Limit Position

In the course of forming a hole in the work piece the drill bit may encounter resistance of an order which may tend to distort or fatigue the drill bit likely to result in a broken bit. The machine tool in this instance therefore includes means to compare the torque of the tool bit to an optimum standard such that when the drill bit encounters torque likely to cause damage, means are actuated which will reduce the feed rate as well as the speed of the drill bit and if further decrease in speed and feed are demanded, then means are actuated to cause the drill bit to be retracted. Before describing in detail how these conditions are sensed or determined, I will first describe the manifest result of the circumstance where retraction of the drill is demanded.

It has been explained that a second cylinder 242, FIG. 7, and a corresponding rod 242R are afforded. It will be noted that the end of the rod 242R opposite that presenting the piston to the cylinder is provided with a memory element 51 in the form of a wedge-shaped cam serving as a switch actuator. As shown in FIGS. 11 and 13, the rod 242R extends through a lug 291 which is part of the motor support carriage 230, the switch actuator 51 being on the drill side of the lug 291. The switch actuator or memory unit 51 is juxtaposed over a momentary (MICRO) switch 295 confined between lug 291 and a second lug 292. The switch 295 presents a control button 296, and normally the actuator 51 carried by the rod 242R holds the swtich button 296 in a switch-closed position which in a position characterizing normal operating conditions so far as concerns establishment of a slow forward feed of the drill during a normal advancing stroke when the drill is working. When, however, the resistance encountered by the drill bit is such as ultimately to demand retraction of the drill, fluid under pressure ceases to be supplied to the inlet 243 (advance the drill) of cylinder 241, and instead fluid under pressure (retract) is supplied to the other inlet 244, FIG. 7.

Piston rod 240 is retracted and at the same time carriage 230, being joined thereto, is retracted. Lug 291, FIG. 13, then slides to the right along the piston rod 242R, the latter being stationary, so that the momentary switch 295 retracts from the switch actuator 51. The button 296 then encounters the low side of the switch actuator in effect opening switch 295. Lug 292 is formed with a clearance hole 292A aligned with cam 51. Switch 295 being open characterizes a circumstance where rapid forward feed of the drill in the next advancing stroke will be tolerated until switch 295 is again closed, upon encountering cam 51, to re-establish a normal rate of slow feed.

Thus, when the circumstance of high resistance to tool torque is such as to demand tool retraction, the carriage 230, FIG. 7, is pulled to the right and is fully retracted to its so-called low limit position, in which event the pointed end of the drill bit will be aligned with the oil feed passages 272–273, FIG. 10, enabling oil to be dropped thereon.

The machine is equipped with a linear potentiometer 50, FIG. 7, which senses both the low limit and the high limit position of the drill. The linear potentiometer is of a known kind and is supported in a fixed position in the head 55. The output voltage of the potentiometer is varied by a slide (not shown) on the right hand end of a rod 298, as viewed in FIG. 7, fastened to the cross plate 245 of the carriage 230. Thus, the effective resistance of the windings of the potentiometer varies depending upon the position of rod 298 to establish a voltage therein corresponding to the low limit position (full retraction) of the drill bit and a separate voltage corresponding to the high limit or full penetration of the drill bit completing the vent opening. Of course means other than a linear potentiometer may be used to sense the low and high limit positions of the drill, but in any event, the linear potentiometer constitutes a means for sensing the fully retracted or the fully advanced position of the drill (or indeed any intermediate position) and its output voltage is used to control a pair of servo valves as hereinafter described to reverse the flow of fluid under pressure in cylinder 241 at these times.

Thus, in the circumstance under consideration where the torque sensing was such as to demand retraction of the drill, the drill is retracted until the sensing means 50 senses the low limit position whereupon the flow of fluid under pressure in cylinder 241 is again reversed causing re-advancement of the piston rod 240. This is a rapid advance just as retraction was a rapid stroke or feed of the rod 240, and the microswitch 295 moves rapidly forward from its low limit position until its button 296 strikes the high side of the switch actuator 51 which, it will be recalled, was left behind in a stationary position at the commencement of the retraction cycle. When switch 295 is thus closed, the desired slow forward feed is re-established inasmuch as the working end of the drill back at the dead end of the vent hole from which point further drilling is to proceed.

Feeding Oil To The Working Tip of the Drill

Whether retraction of the drill bit be a normal operation, following completion of the drilled hole, or whether retraction occur as an incident to encountering high resistance in the course of penetrating the work piece, lubricant or cutting oil is to be furnished to the tip of the drill bit in its fully retracted position, as was explained.

It is now appropriate to mention that the reservoir for oil may be contained in a recess in the arm 45, or it may be located elsewhere in the machine. The arm 45 and its column 70 also serve to house a great deal of the wiring associated with the electrical circuitry which, as in the instance of air and oil, pass through the arm and the heads 44 and 55 to certain of the parts to be controlled.

Referring to FIG. 23, the cutting oil is contained in a reservoir 300, and inasmuch as the machine normally includes two drill heads for working simultaneously on two molds, there are a pair of outlet conduits 301 and 302 through which lubricant is forced under pressure to the oil feed passage in the bushing 200. The description to follow will thereby be concerned with conduit 302 inasmuch as the operation entailed with the other conduit 301 is identical.

Lubricant is under pressure in the reservoir 300, and this reservoir is tapped by a conduit 305 which is connected to a four-way valve 306, of known construction, under control of a solenoid 310. The solenoid 310 in turn is responsive to the low limit voltage of the linear potentiometer, which is to say that when the sensing means, of whatever form, establishes that full retraction of the drill has been achieved, then a corresponding electrical pulse is delivered to solenoid 310 which will position the spool of the four-way valve 306 to allow lubricant to be passed through conduit 302 to the feed passage in the drill head 55.

As shown in FIG. 23, a cylinder 315 is arranged at one side of the four-way valve 306. In this cylinder is a reciprocal piston (not shown) adapted to be driven in opposite directions within cylinder 315 depending upon whether there is lubricant under pressure in a conduit 317 or alternately in conduit 318. Thus, the same lubricant obtained from reservoir 300 is used to operate the piston in the cylinder 315. In one actuated position of the four-way valve 309, conduit 318 will be in communication with the supply conduit 305, forcing the piston in cylinder 315 "up" in the sense of FIG. 23, and lubricant on the low pressure side of the piston in cylinder 315 is forced out conduit 317 and through a passage in the four-way valve to conduit 302.

The pulse of the solenoid 310 is momentary in order, so that but a few drops of lubricant are actually forced through conduit 302 by the piston in cylinder 315. When the electrical signal to solenoid 310 is extinguished, the direction of the four-way valve is in effect changed for the next cycle, which is to say that on the next operation of solenoid 310, conduit 317 is in communication with the supply conduit 305 and the piston in cylinder 315 will be forced "down" as viewed in FIG. 23 causing a few drops of oil to be forced through conduit 318 and the four-way valve to the supply conduit 302.

FIG. 24 is a diagrammatic view of the hydraulic circuit and certain of the electrical controls, the hydraulic circuit being shown in standard symbology in other figures. However, and referring to FIG. 24, the tachometer 48 is associated with the drill motor 24 to sense the rpms thereof in the course of operation. The tachometer has a small generator which translates these rpms into voltage analogues, and these voltage analogues are delivered constantly to a comparing unit (not shown) where the operating rpm is compared to what the rpm should be for the type of work involved. In the event that unexpected resistance is encountered by the drill in the course of operation, the rpm will necessarily drop off and the comparing unit will then demand a slower rate of drill feed to allow the rpm to return to the standard condition if possible. Thus, when resistance is encountered initially, the requirement is to slow the feed by furnishing fluid under pressure at a correspondingly slower rate to the inlet 243 of the main cylinder 241. Drill feed and drill speed are thus directly related. In this connection, a servo valve 330 (reversing valve) is provided for regulating the effective rate of delivery of fluid under pressure to inlet 243 of cylinder 241. Thus, when a slower rate of feed (per revolution) is demanded as the result of sensing an rpm differential compared to the standard, an electrical signal is generated by the rpm comparing unit and is delivered to the control element of the servo valve 330. This contracts the valve opening, resulting in a lesser rate of delivery of fluid under pressure to cylinder 241 and thereby slowing down the feed rate of the drill bit (per revolution) in its penetration of the work piece.

If the encountered seizure or resistance in the work piece is overcome, the slower rate of feed will allow an increase in rpm as detected by the tachometer. However, if seizure or resistance still prevails, failure to comply with the rpm standard will again be registered and there will be a further demand for a slower rate of feed registered by the servo valve 330. These signals to the servo valve 330 may be viewed as a decrease in power delivery to the servo valve. When the rpm parameter (tachometer) and the lowered power parameter (servo valve) together reach a predetermined minimum characterizing a predetermined maximum resitance in the work piece, then the demand is for full retraction of the drill, and servo valve 330 is reversed.

The servo valve 330 receives fluid at constant pressure from a conduit 335 connected to a constant pressure pump (not shown). Another conduit 336 leads to the reservoir. Under normal slow feed conditions, valve 330 supplies a conduit 337 connected to the inlet 243 of cylinder 241, and inlet 244 is connected to the drain or return line 336 through valve 330. The signal demanding full retraction of the drill is manifest in a reversal of the servo valve 330 in the sense that fluid under pressure is then delivered through conduit 338 to the inlet 244 of the cylinder while inlet 243 is drained, causing retraction of the piston rod 240. Again it is to be borne in mind that the present machine includes means to sense both the high (full penetration) and low (fully retracted) limits of the drill. When the high limit or full penetration is reached as sensed by the potentiometer, servo valve 330 is automatically reversed to cause retraction, just as in the instance of retraction when high resistance in the work piece is encountered; and upon reversal, retraction is a high speed operation manifest in a "wide open" state of valve 330.

The primary function of cylinder 242 is to constantly register the depth to which the drill has penetrated the work piece. The reason for this is that the hydraulic circuitry is such that during normal operation a relatively slow feed is established for the drill, as mentioned, whereas when retraction of the drill occurs, this is to take place at a higher speed or rate, and the return of the drill following resistance retraction is to also take place at a high rate until its former position is attained. Therefore, a means is afforded to constantly sense or register the advancing position of the drill, and it will be recalled that this means takes the form of the momentary switch 295. As long as this switch is held closed, the servo valve 330 assures a normal condition or slow rate of forward feed of the drill motor carriage, but when this switch is opened upon resistance retraction, the servo valve 330 is opened wide to permit flow of fluid in conduit 338 at the highest rate. This same rapid stroke condition will prevail when rod 240 is returned following a resistance retraction cycle. As noted, the voltage of the potentiometer can be an independent control in the servo valve 330 apart from reversal of valve 330 which may occur as the result of rpm sensing.

Rod 242R in effect will not be retracted except at the end of a normal penetration cycle. At this time, rod 242R is retracted simultaneously with retraction of rod 240 incidental to returning the drill unit to start a new hole. Therefore, means are provided to furnish oil under pressure to cylinder 242 to retract rod 242R, and to this end, FIG. 24, a conduit 340 is connected at one end to an oil supply reservoir 342 and at its opposite end feeds an inlet at the rod end of cylinder 242 to retract the rod 242R.

A second conduit 344 is connected to the opposite end of cylinder 242 and leads to a normally-closed valve 345 which is controlled by a solenoid 346. When valve 345 is opened, oil in cylinder 242 is permitted to drain therethrough to a conduit 348 connected to a drain reservoir 350.

The oil reservoir 342 is under confined pressure. The reservoirs 342 and 350 may be located in the over-arm 45. When the linear potentiometer senses that the high limit or full penetration has been realized, it is effective to deliver a signal to the coil of solenoid 346 concurrently with delivery of a reversing signal to the servo valve 330. Resultantly, valve 345 is opened allowing the opposite end of cylinder 242 to be drained, and at this time the normal pressure head in reservoir 342 is effective on the fluid in conduit 340 to return piston 242R.

Air for cleaning the drill bit is furnished by a conduit 355 in turn supplied by a line 357, FIG. 24, connected to some source of air preferably at about 90 psi pressure. Line 357 supplied by air from a source, at pressure, is connected to a solenoid valve 358 and the output of valve 358 is connected to a needle valve 359, allowing for adjustment in the quantity of air used for cleaning the drill bit. Air at the time of delivery may be a constant stream or a series of pulses as may be established through appropriate control over the solenoid valve 358.

Coolant may be independently supplied to the conduit 355 from a coolant reservoir 361 in which pressure may be at 90 psi, as shown in FIG. 24. The reservoir 361 is tapped by a conduit 362 connected to a solenoid valve 363, the output of which is directed to an adjustable needle valve 365, and the outlet of the needle valve 365 is connected to the conduit 355. Again coolant for cooling the drill bit may be a series of pulses or a constant delivery at the time the drill is retracted, and the fluid stream for effecting cooling may be of any desired form.

I claim:

1. In a machine tool characterized by a driven tool, a main vertically oriented support column adapted to be fixed to the bed of the machine tool, said column supporting a horizontal overarm in cantilever fashion, the tool being supported in depending relation from a head index located adjacent the outer end of said overarm, a worm wheel fixed to the overarm, a sleeve normally clamped tight to the worm wheel and projecting axially thereof, said head index being coaxial with and secured to the sleeve whereby the head index is held in a fixed rotative position relative to the worm wheel, a worm gear supported by the head index and being engaged with the worm wheel, means enabling the worm gear to be rotated, means to unclamp the sleeve relative to the worm wheel whereby upon unclamping the sleeve and rotating the worm gear the head index is caused to revolve about said worm wheel to an adjusted position.

2. In a machine tool characterized by a tool which is to be positioned at a selected operating angle, means supporting the tool including a head index carried by an arm and a support head mounted on the head index, the tool being carried by the support head, a gear fixed to said arm and affording a track relative to which the head index may rotate about a predetermined axis, the support head being mounted on the head index for rotation about an axis normal to said predetermined axis, a driven shaft and gears for rotating the support head, means to releasably clamp the head index to said arm, a traveling gear carried by the head index and engaging said fixed gear to travel thereabout when the traveling gear is rotated, and means to selectively rotate either the traveling gear or the support head driven shaft when the clamp means is released thereby rotating the head index about said predetermined axis and the support head about the other axis, the last-named means including:

a manually positionable rotatable driving shaft positionable to either a first or second position, a first set of gears engageable in said first position of the driving shaft to rotate the traveling gear when the driving shaft is rotated, a second set of gears engageable in said second position of the driving shaft to rotate said driven shaft when the driving shaft is rotated, manual means to selectively position the driving shaft, and manual means to rotate the driving shaft.

* * * * *